(12) United States Patent
Kuster et al.

(10) Patent No.: US 11,997,764 B2
(45) Date of Patent: May 28, 2024

(54) HEAT TRACE CHARACTERIZATION AND CONTROL METHOD AND SYSTEM

(71) Applicant: AEF Ice Systems, Inc., Mamaroneck, NY (US)

(72) Inventors: Travis M. Kuster, Brooklyn, NY (US); Connor J. Tinen, New York, NY (US); Alexander F. Brown, Brooklyn, NY (US); Robert J. Nikolai, Wildwood, FL (US)

(73) Assignee: Frio, LLC, Durham, NC (US)

( * ) Notice: Subject to any disclaimer, the term of this patent is extended or adjusted under 35 U.S.C. 154(b) by 201 days.

(21) Appl. No.: 17/326,854

(22) Filed: May 21, 2021

(65) Prior Publication Data

US 2021/0378058 A1 Dec. 2, 2021

Related U.S. Application Data

(60) Provisional application No. 63/031,014, filed on May 28, 2020.

(51) Int. Cl.
*H05B 1/02* (2006.01)
*G01K 7/16* (2006.01)
*H05B 3/00* (2006.01)

(52) U.S. Cl.
CPC ............. *H05B 1/0294* (2013.01); *G01K 7/16* (2013.01); *H05B 3/0014* (2013.01); *H05B 2203/019* (2013.01); *H05B 2203/02* (2013.01)

(58) Field of Classification Search
CPC ................ H05B 1/0294; H05B 3/0014; H05B 2203/019; H05B 2203/02; H05B 1/023; G01K 7/16
See application file for complete search history.

(56) References Cited

U.S. PATENT DOCUMENTS

| 4,304,044 A | 12/1981 | Lee |
| 6,207,939 B1 | 3/2001 | Allaire et al. |

(Continued)

FOREIGN PATENT DOCUMENTS

| CA | 2802204 A1 | 7/2014 |
| CN | 205443974 U | 8/2016 |

(Continued)

OTHER PUBLICATIONS

International Search Report and Written Opinion dated Jan. 10, 2022; International Application No. PCT/US21/33622; International Filing Date: May 21, 2021; 15 pages.

(Continued)

*Primary Examiner* — Alvaro E Fortich
(74) *Attorney, Agent, or Firm* — Blank Rome LLP

(57) ABSTRACT

The present invention involves calibrating a control system to enable resistance-based control of a heat tracing circuit, that includes characterizing a piece of heat trace to determine a relationship between resistance and temperature, allowing for more precise control. Also described are different methods for practical resistance-based control of a heat trace system. Further described are several methods to monitor heat trace: including methods to enhance monitoring capabilities using a system operating model; comparison to historical operating data; and inclusion of information from external sources. Also provided is a method by which a piece of heat trace of unknown length and power factor can be controlled using the resistance-based method when other system information is available.

19 Claims, 12 Drawing Sheets

(56) References Cited

U.S. PATENT DOCUMENTS

| | | | |
|---|---|---|---|
| 6,682,259 | B1 | 1/2004 | Thomas, Sr. et al. |
| 6,723,971 | B1 | 4/2004 | Petrenko et al. |
| 6,825,444 | B1 | 11/2004 | Tuan et al. |
| 6,870,139 | B2 | 3/2005 | Petrenko |
| 7,038,125 | B2 | 5/2006 | Petrenko et al. |
| 7,164,100 | B2 | 1/2007 | Petrenko et al. |
| 8,716,634 | B2 * | 5/2014 | Biller .................. H05B 3/12 219/505 |
| 9,006,617 | B2 * | 4/2015 | Mullen .................. G05D 27/02 219/494 |
| 9,078,292 | B1 | 7/2015 | Mullen |
| 9,345,067 | B2 | 5/2016 | Biller |
| 9,346,550 | B2 | 5/2016 | Gambino et al. |
| 9,512,580 | B2 | 12/2016 | Duncan et al. |
| 10,113,278 | B1 | 10/2018 | Carney |
| 2003/0077121 | A1 | 4/2003 | Chun |
| 2005/0047864 | A1 | 3/2005 | Yamada et al. |
| 2009/0114422 | A1 | 5/2009 | Longatti |
| 2009/0287355 | A1 | 11/2009 | Milder et al. |
| 2010/0282460 | A1 | 11/2010 | Stone et al. |
| 2011/0192832 | A1 * | 8/2011 | Biller .................. H05B 3/12 219/494 |
| 2011/0250015 | A1 | 10/2011 | Cardoso |
| 2013/0343818 | A1 | 12/2013 | Bandura |
| 2014/0191084 | A1 * | 7/2014 | Gambino .............. B64D 15/12 244/134 D |
| 2014/0217079 | A1 | 8/2014 | Nelson |
| 2015/0034067 | A1 | 2/2015 | Szekely |
| 2016/0032539 | A1 | 2/2016 | Buch |
| 2016/0138812 | A1 | 5/2016 | Losi |
| 2017/0030039 | A1 | 2/2017 | Perez et al. |
| 2017/0191228 | A1 | 7/2017 | Dong |
| 2019/0360739 | A1 * | 11/2019 | Brown .................. E01D 19/16 |
| 2019/0383670 | A1 | 12/2019 | Sathik et al. |

FOREIGN PATENT DOCUMENTS

| | | |
|---|---|---|
| CN | 105926442 A | 9/2016 |
| CN | 205741914 U | 11/2016 |
| CN | 108316146 A | 7/2018 |
| CN | 208023412 U | 10/2018 |
| DE | 10337937 A1 | 3/2005 |
| JP | 2006322177 A | 11/2006 |
| JP | 200821483 A | 1/2008 |
| JP | 2008290194 A | 8/2008 |
| KR | 20180032299 A | 3/2018 |

OTHER PUBLICATIONS

English translation of Korea Published Application KR20180032299; Publication Date: Mar. 30, 2018; 15 pages.

Kleissl, K. et al., (2010) "Bridge ice accretion and de-and anti-icing systems: A review." In the 7th International Cable Supported Bridge Operators' Conference: Proceedings. (pp. 161-167).

Laursen, Ernst et al., 2004. The great belt bridge, Denmark: Structural Monitoring. In: the 4th International Cable Supported Bridge Operators; Conference (ICSBOC). pp. 89-98.

Petrenko, Victor, (2007). Ice adhesion and ice friction modification using pulsed thermal power. Dartmouth College.

Petrenko, Victor et al., (2011). "Pulse electro-thermal de-icer (PETD)." Cold Regions Science and Technology. 65.70-78.10.1016/j.coldregions. 2010.06.002.

Nims, Douglas et al., (2014). "Ice preventions or removal on the Veteran's Glass City Skyway Cables" Final Report Ohio Department of Transportation Office of Research and Development, State Job No. 134489.

Mirto, Clinton J., "A sensor for ice monitoring on bridge superstructures." (2015) Theses and Dissertations. paper 1855.

Liktkumchorn, Nuhavit: (2014). "Ice prevention and weather monitoring on cable-stayed bridges", Theses and Dissertations. 1750.M. S. Thesis Paper—University of Toledo.

English translation, China Publication No. CN105926442; Publication Date: Sep. 7, 2016; 7 pages.

English translation, China Publication No. CN205741914; Publication Date: Nov. 30, 2016; 4 pages.

English translation; Japan Publication No. JP2006322177; Publication Date: Nov. 30, 2006; 6 pages.

English translation; Japan Publication No. JP2008021483; Publication Date: Jan. 31, 2008; 5 pages.

Eiche, Michael, "System Failure Case Study—Ice Falling from Port Mann Bridge Cables"; www.engeeringnewworld.com; Dec. 22, 2016; 4 pages.

Meiszner, Peter, Port Mann Bridge Dec. 20, 2013; "Ice bomb prevention system"; https://globalnews.ca/news/1044434/port-mann-bridge-ice-bomb-prevnetion-system-debuts-during-todays-snowy-weather/; 1 page.

English translation; Japanese Published Application No. JP2008190194; Publication Date: Aug. 21, 2008; 9 pages.

English translation; Chinese Published Application No. CN108316146; Publication Date: Jul. 24, 2018; 12 pages.

English translation; Chinese Published Application No. CN208023412; Publication Date: Oct. 30, 2018; 7 pages.

English translation; German Published Application No. DE10337937; Publication Date: Mar. 24, 2005; 16 pages.

English translation; Chinese Published Application No. CN205443974; Publication Date: Aug. 10, 2016; 7 pages.

* cited by examiner

HEAT TRACE CHARACTERIZATION AND CONTROL METHOD AND SYSTEM

RELATED APPLICATION

This application claims benefit of priority of U.S. Provisional Application Ser. No. 63/031,014, filed May 28, 2020; which application is incorporated herein by reference.

FIELD OF THE INVENTION

The present invention relates generally to heat trace used for freeze protection, snow melting, de-icing, process and pipeline temperature maintenance, and floor heating; and more particularly to calibrating a control system to enable resistance-based control of a heat tracing circuit.

BACKGROUND OF THE INVENTION

Heaters are often connected to a controller that is designed to keep the heater in a certain temperature range. Many state-of-the-art controllers use a temperature sensor either located on the heater or elsewhere in the system as a basis for control.

Many heaters rely on running an electric current through a heating element made of a resistive material. As the temperature in the heating element changes, the resistance of the element changes.

The relationship between the temperature of the heating element and the resistance of the heating element can be used to control the heating element. Some prior art exists around using the resistance of a heating element as a proxy for temperature and controlling the heating element based on the resistance signal. However, the methods described in the prior art are not applicable to dynamic heating elements with complex temperature vs. resistance relationships, such as self-regulating heat trace.

The prior art relies on calibrating the system by measuring the initial value of resistance at a known temperature. Self-regulating heat trace experiences a large in-rush current resulting in a different temperature to resistance relationship during the in-rush period, preventing an accurate initial resistance measurement. In addition, self-regulating heat trace has wide manufacturing tolerances and experiences inconsistent heating which is highly dependent on its surroundings. These factors further complicate efforts to use a resistance-based control method on self-regulating heat trace.

Self-regulating heat trace is a type of heating cable made up of two bus wires with a core of a conductive polymer material. As the polymer material heats, it expands, reducing the number of conductive paths through the polymer material and increasing the electrical resistance between the bus wires. Due to this effect, as the temperature of the heat trace increases, the electrical resistance increases, causing the power output of the cable to decrease. This process is the self-regulating behavior of the heating cable; as temperature increases, power output decreases.

The self-regulating behavior of the heating cable is approximately linear within a typical operating temperature zone of −20° C. to 100° C., allowing a linear relationship to be established between the resistance of the cable and the temperature of the cable. Such a relationship can be used to determine the temperature of a cable by monitoring the voltage and current of the heating circuit from the power source, allowing for temperature-based control without the use of any temperature sensors.

Resistance-based measurement of heater temperature is useful in applications where using temperature sensors is expensive or impossible, because it allows for control based directly on the temperature of the heating element. This method is of further interest for self-regulating heat trace, which can experience large variations in temperature along its length. For example, a section of heat trace in good thermal contact with a cold pipe may be much colder than a section only 10 ft away that is in free air. Using a single point temperature sensor provides information about the short section of trace in contact with the temperature sensor but may have little bearing on other areas of the same piece of heat trace. The resistance-based method provides an average temperature for the entire piece of trace. For critical applications that typically rely on large numbers of temperature sensors to increase reliability, resistance-based temperature provides a better option to ensure more accurate control.

The following describes the challenges of using measured values of resistance to control self-regulating heat trace and provides several methods to overcome these challenges, allowing for more advanced control and monitoring of self-regulating systems. The methods described herein include characterization and calibration of the heating control system, control of the heating system, monitoring of the heating system, data tracking in order to improve monitoring of the heating system, and using external system data to improve control and monitoring of the heating system.

The practical accuracy of using resistance to control a given piece of heat trace is limited by two key factors. First, the resistance of a given piece of heat trace depends on both the resistance per unit length of the heat trace and the length of the piece of heat trace. As such, accurate control requires a precise knowledge of the length of the piece in question. Second, the linear relationship between resistance and temperature for a given piece of trace depends on the number of conductive paths per foot in the polymer material which determines the power factor (γ) of the piece of trace. This power factor is highly dependent on the manufacturing process and can vary widely, even within a single piece of trace. As a result, the power factor of the trace must be determined on a case by case basis.

The electrical structure of self-regulating heat trace can be modeled as a ladder of parallel conductive paths through the polymer material. This structure allows the heat trace to be cut to any length in the field during the installation process. The structure also enables any number of self-regulating heating cables to be connected in series or parallel without changing the basic system of parallel conductive paths. Thus, the total resistance of the heating circuit is determined by the total length of heat trace on the control circuit multiplied by the average number of conductive paths per foot.

During the initial period of heating for a piece of heat trace, the power is much higher than it is during standard operation. The elevated current during this period is called the in-rush current. Testing shows that for a given piece of heat trace, the in-rush current depends on starting temperature and operating voltage. Applying a voltage to a piece of heat trace causes heating in the polymer core, resulting in changes to the number of conductive paths and thus the measured current. Since typical resistance measurement devices apply a test voltage and measure current, they cannot accurately measure the initial resistance of a piece of heat trace. The resistance of a piece of heat trace must be measured by applying the operating voltage and measuring current and voltage continuously, dividing voltage by current to establish resistance.

Manufacturing tolerances result in a wide range of conductive paths per linear foot. Thus the power factor varies along the length of a given piece of trace such that the power factor at any given point of trace may be defined as the linear power factor. The overall power factor for a piece of trace is the average linear power factor for the entire piece of heat trace.

Prior art describes two methods to use resistance as a control signal for a heating element. In the first, either a look up table or linear relationship is constructed by measuring the resistance value of the heater at different temperatures. This method is limited to heating elements where the cold resistance can accurately be measured and is not suitable for self-regulating heat trace. In the second method, a linear approximation of the relationship between temperature and resistance of the heating element is used along with a single calibration point of an initial resistance and temperature. Aside from the reliance upon cold resistance, this method is also unsuitable for self-regulating heat trace because it requires the linear relationship between temperature and resistance to be consistent across different heaters of the same type. This requirement is suitable for heating elements that are composed of one material, such as wire or thin film elements. However, the requirement renders this method unsuitable for composite heating elements such as self-regulating heat trace where the resistance is variable from heater to heater.

In order to determine the temperature of self-regulating heat trace using measured resistance, a new calibration method is needed. Furthermore, this calibration method must also serve to characterize the specific piece of heat trace in question to account for variations in the manufacturing process.

SUMMARY OF THE INVENTION

The present invention describes a method and system for calibrating a control system to enable resistance-based control of a heat tracing circuit. The method includes characterizing a piece of heat trace to determine a more accurate relationship between resistance and temperature, allowing for more precise control. Also described are different methods for practical resistance-based control of a heat trace system. Further, the below describes several methods to monitor heat trace: including methods to enhance monitoring capabilities using a system operating model; comparison to historical operating data; and inclusion of information from external sources. The present invention also describes a method by which a piece of heat trace of unknown length and power factor can be controlled using the resistance-based method when other system information is available.

In one aspect, the present invention includes a method for determining a relationship between a resistance of a piece of heat trace $R_T$ and a temperature of the piece of heat trace $T_T$, the method comprising the step of using a relationship $$T_T = (\mu)\frac{R_T}{\ell} + \beta$$

where $\mu$ and $\beta$ are constants, depending on a type of heat trace, and $\ell$ is a length of the piece of heat trace.

In another aspect, an average temperature is determined for a piece of heat trace using measured resistance, and includes using measured current and voltage to determine a measured resistance of the piece of heat trace while the piece of heat trace is active; and using the determined measured resistance of the piece of heat trace to determine an average temperature of the piece of heat trace. In addition, the average temperature determined can be used as a basis for control, where a control algorithm governs turning a heater on or off based on the average temperature determined, thereby achieving the desired temperature set point or range.

In a further aspect, a heat tracing system can be monitored to identify abnormal operation indicative of fault conditions, and includes using a system model to determine an expected operating range for the heat tracing system; and noting deviations from the expected operating range as fault conditions.

In a still further aspect, a length $\ell$ of a piece of heat trace with a known power factor is determined, and includes measuring a minimum initial resistance $R_{MIN}$; and using $$\ell = \frac{R_{MIN}}{\delta T_0 + \tau}$$

where $\delta$ and $\tau$ are constants, depending on the power factor of the piece of heat trace, and $T_0$ is a starting temperature of the piece of heat trace.

In other aspects of the present invention, a heat trace system is used to calibrate a control system to enable resistance-based control of a heat tracing circuit. More particularly, the heat trace system performs the determinations detailed above, such as determining a relationship between a resistance and a temperature of a piece of heat trace; determining an average temperature of a piece of heat trace using measured resistance, then optionally using the average temperature determined as a basis for control; monitoring a heat tracing system to identify abnormal operation indicative of fault conditions; and determining a length $\ell$ of a piece of heat trace when the piece of heat trace has a known power factor.

In certain embodiments, the heat trace system includes one or more pieces of heat trace, one or more controllers, and various sensors, including sensors to measure voltage and current. In the heat trace system, the one or more controllers are configured to receive sensed information, perform the certain determinations, and to govern certain heat trace activity, all as described herein.

In one aspect, a heat trace system is adapted to determine a relationship between a resistance of a piece of heat trace $R_T$ and a temperature of the piece of heat trace $T_T$, where the one or more controllers are configured to us a relationship $$T_T = (\mu)\frac{R_T}{\ell} + \beta$$

where $\mu$ and $\beta$ are constants, depending on a type of heat trace, and $\ell$ is a length of the piece of heat trace.

In another aspect, a heat trace system is adapted to determine an average temperature for a piece of heat trace using measured resistance, where the one or more controllers are configured to receive a measured current and a measured voltage, determine a measured resistance of the piece of heat trace while the piece of heat trace is active, and use the determined measured resistance of the piece of heat trace to determine an average temperature of the piece of heat trace. In addition, the one or more controllers could be further configured to use the average temperature determined as a basis for control, where a control algorithm governs turning a heater on or off based on the average temperature determined, thereby achieving the desired temperature set point or range.

In a further aspect, a heat trace system is adapted to monitor the system to identify abnormal operation indicative of fault conditions, where the one or more controllers include using a system model to determine an expected operating range for the heat trace system; and noting deviations from the expected operating range as fault conditions.

In a still further aspect, a heat trace system is adapted to determine a length $\ell$ of a piece of heat trace with a known power factor, where the one or more controllers are configured to receive a measure of a minimum initial resistance $R_{MIN}$; and use $$\ell = \frac{R_{MIN}}{\delta T_0 + \tau}$$

where $\delta$ and $\tau$ are constants, depending on the power factor of the piece of heat trace, and $T_0$ is a starting temperature of the piece of heat trace.

BRIEF DESCRIPTION OF THE ILLUSTRATED EMBODIMENTS

The present invention will be better understood with reference to the following description taken in combination with the drawings.

Figure 6:
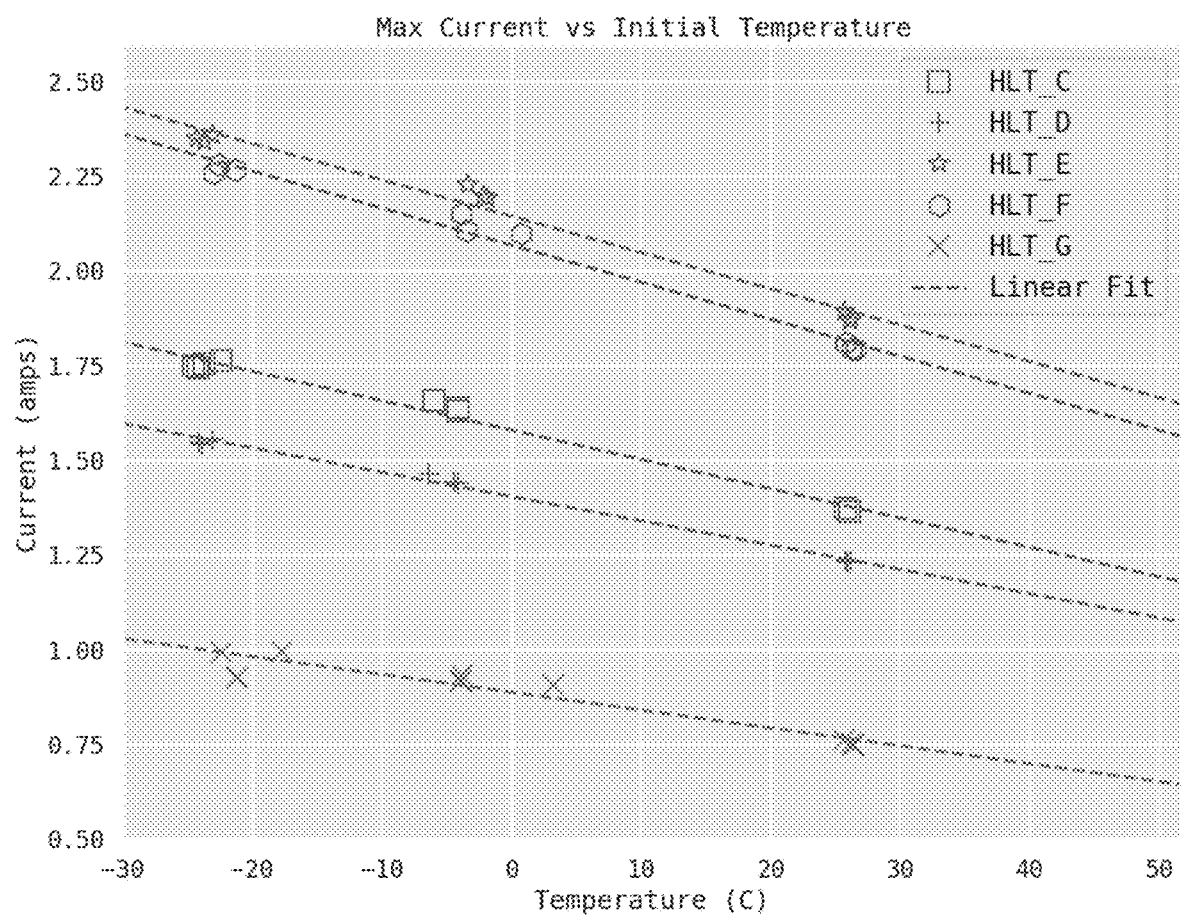
FIG. 6 illustrates maximum initial inrush temperature vs. the starting temperature for multiple pieces of heat trace, each tested at multiple temperatures.
Figure 7:
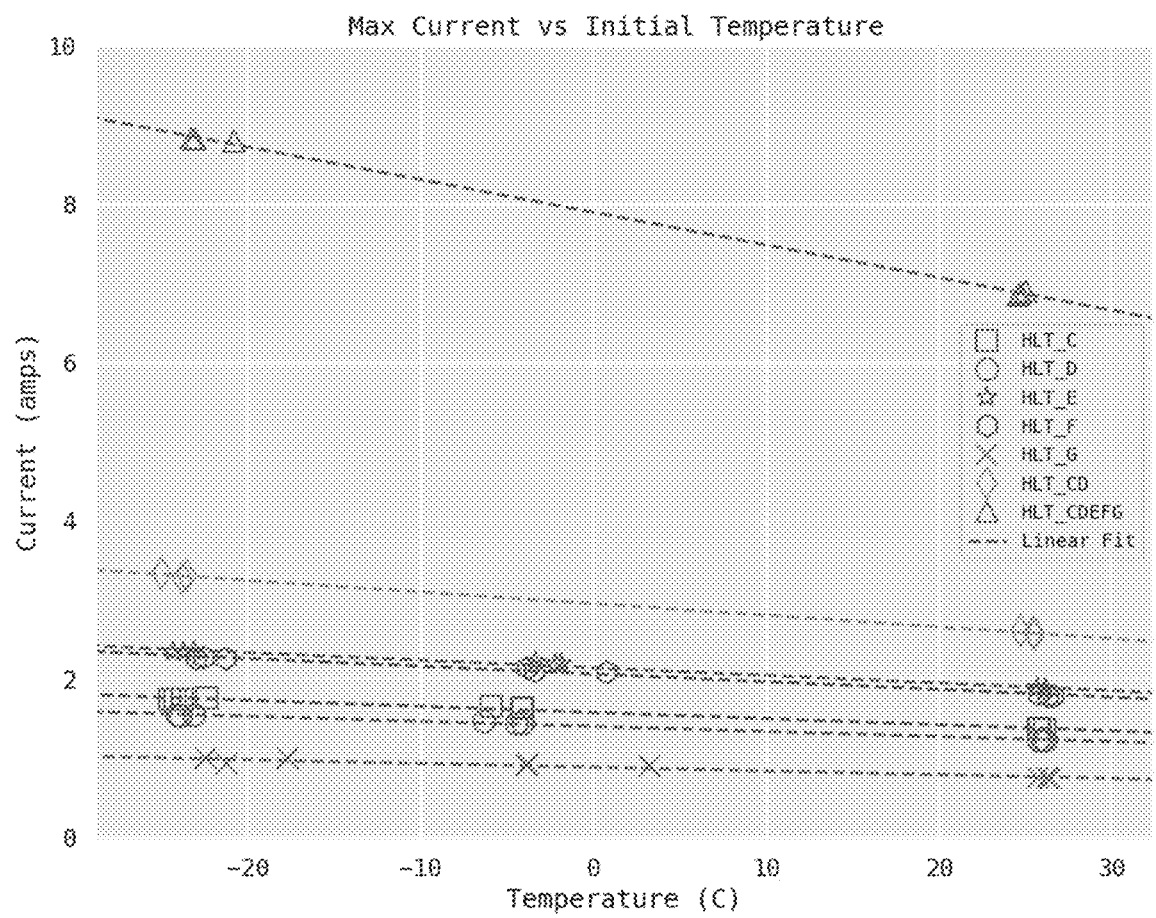
Figure 8:
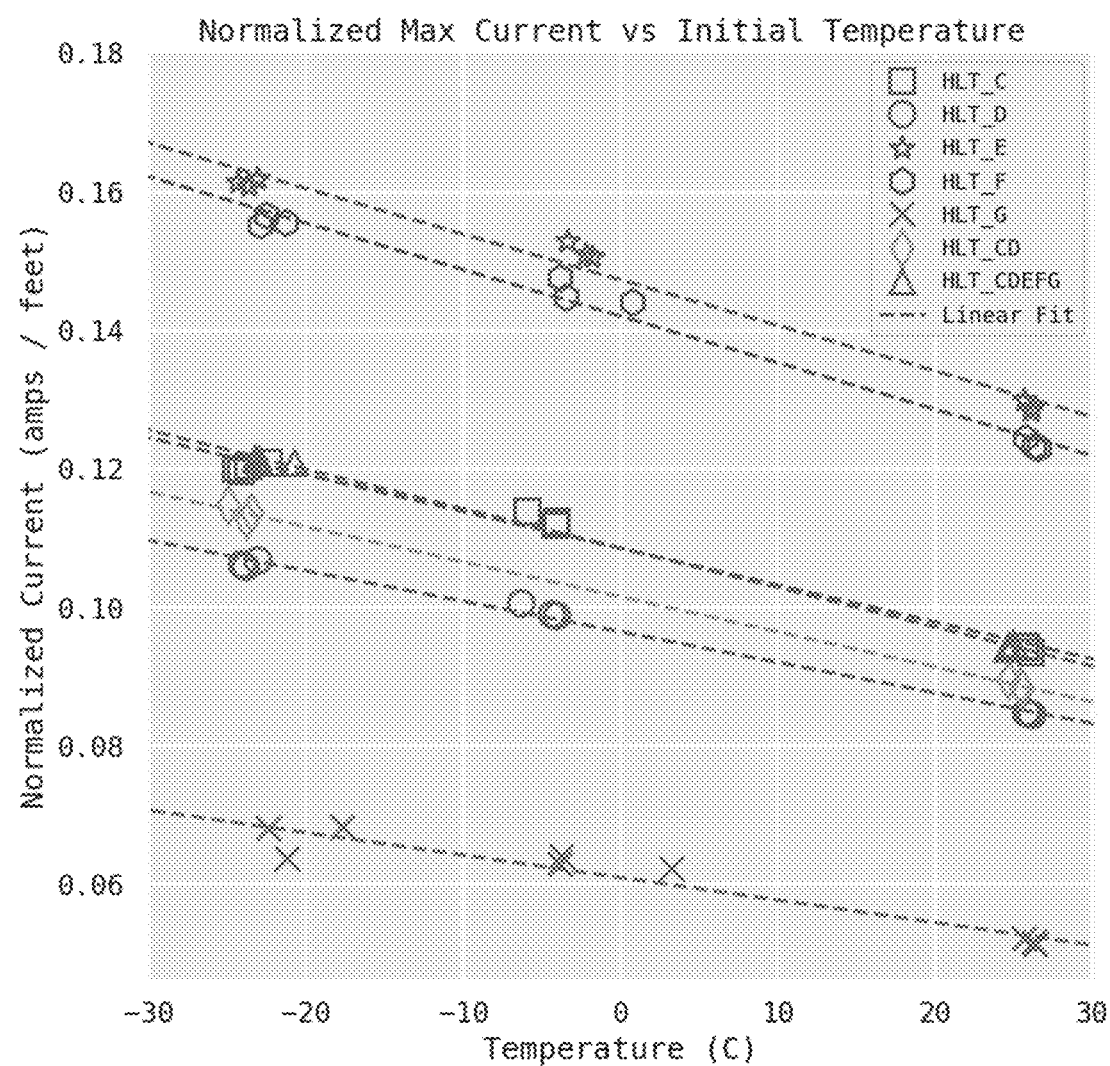
Figure 9:
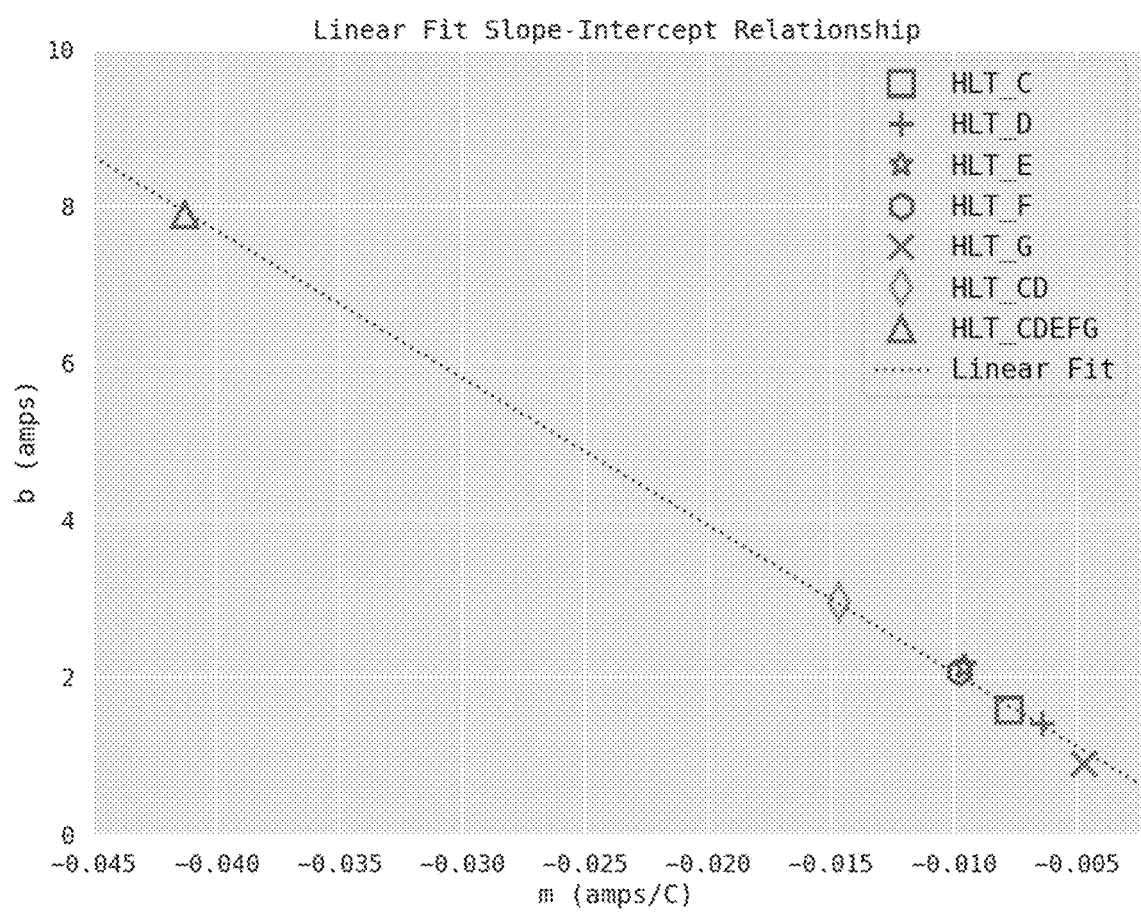
Figure 10:
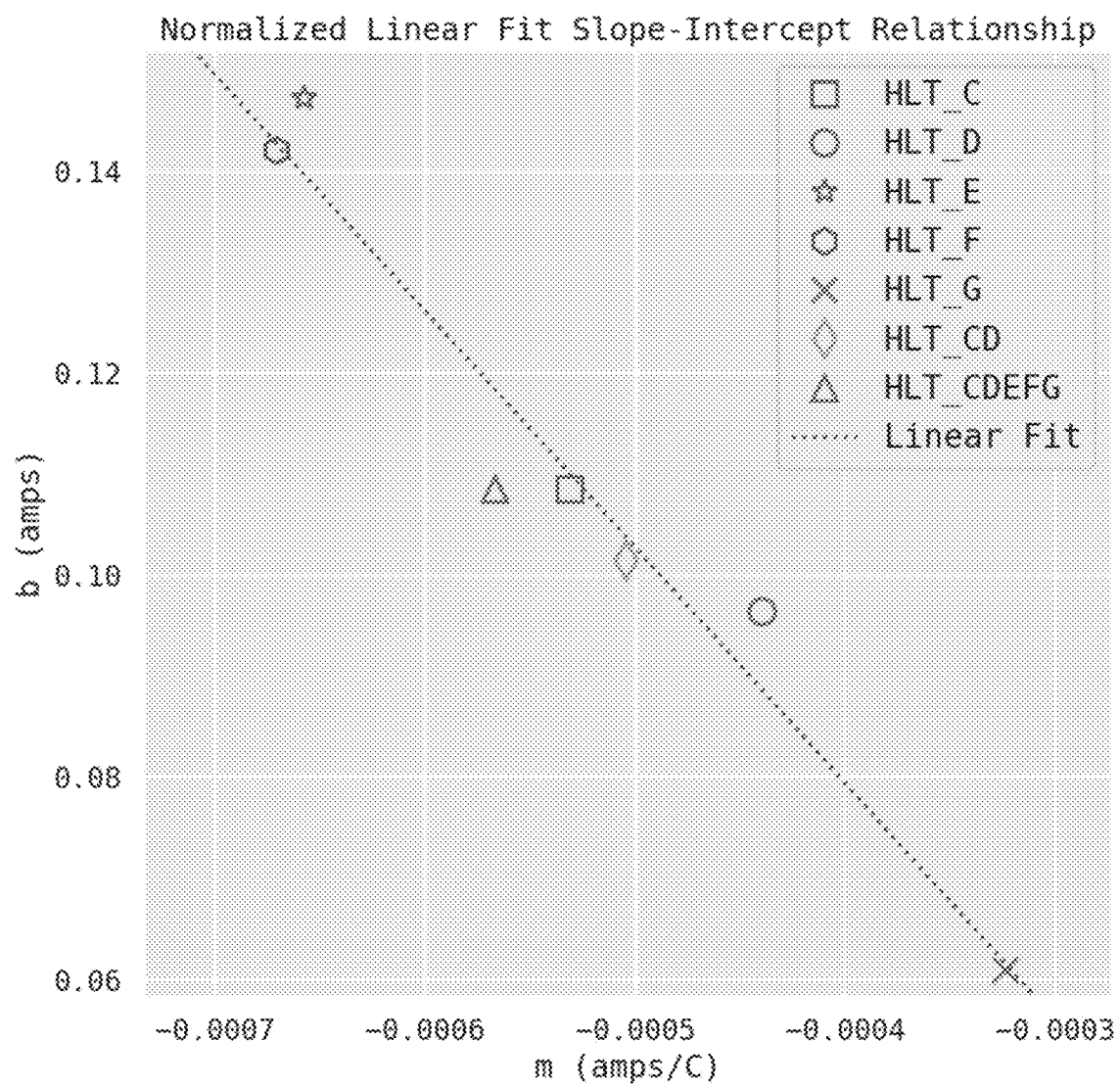
Figure 11:
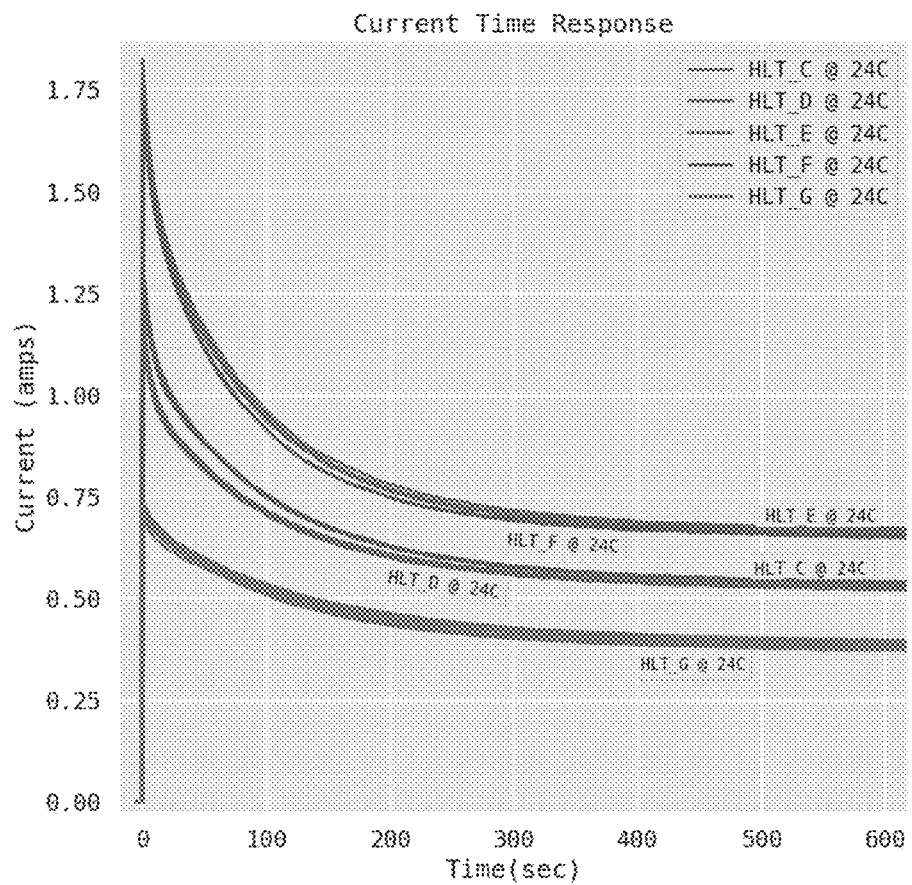
Figure 12:
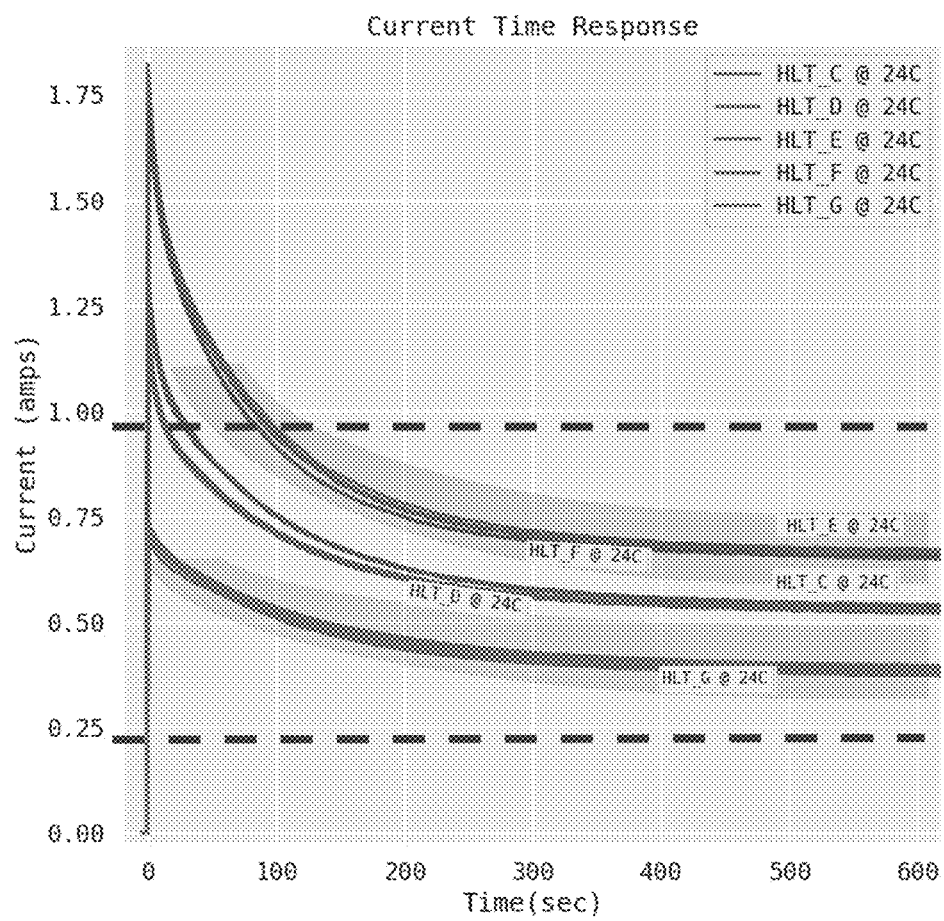

FIG. 7 also illustrates maximum initial inrush temperature vs. the starting temperature for multiple pieces of heat trace, but is resized to include data on two other tests, showing that a linear relationship holds for longer pieces of heat trace and shows dependency on length;

FIG. 8 also illustrates data from the trials shown in FIGS. 6 and 7, but uses normalized maximum initial current on the vertical axis, further showing dependency on length and that each linear fit is differentiated solely by power factor;

FIG. 9 illustrates a relationship between m (slope) and b (intercept) for the linear fits of the data in FIGS. 6 and 7, showing a linear relationship between slope and intercept;

FIG. 10 illustrates a relationship between m (slope) and b (intercept) for the linear fits of the data in FIG. 8;

FIG. 11 illustrates measured current for multiple heating trials of five different pieces of heat trace, showing early maximum current during an inrush heating period; and FIG. 12 also illustrates measured current for multiple heating trials of five different pieces of heat trace, and adds dashed and shaded areas representing dynamic thresholds based on an expected system operating model.

DETAILED DESCRIPTION OF THE EMBODIMENTS

Characterization and Field Calibration (may be Completed in the Factory or in the Field)

To accurately control the temperature of a piece of self-regulating heat trace using the measured resistance of the heat trace, a relationship between temperature and resistance must be established. For most types of heat trace, the relationship between temperature and resistance changes as the heat trace heats up. As a result, there are two distinct phases of heating, the in rush period where the polymer core is initially heated and is expanding rapidly reducing conductivity at a high rate, and the stabilized period where the relationship between temperature and resistance is approximately linear. A linear approximation of the relationship between the average temperature of the heat trace $T_T$ and the resistance of the heat trace $R_T$ during the stabilized period is shown in equation (1) where $\mu$ and $\beta$ are constants and $\ell$ is the length of the piece of heat trace.

$$T_T = (\mu)\frac{R_T}{\ell} + \beta \qquad (1)$$

The resistance of the piece of heat trace that is operating can be calculated by measuring the voltage and current of the heating circuit and dividing the voltage by the current. For systems with relatively stable voltage, it may suffice to measure the current and use a constant value for the voltage. The length of the piece of heat trace must be known and can be measured when the trace is cut to length and installed.

In equation (1), $\mu$ is in units of ((temperature*length)/resistance) which would commonly be expressed in ((Degrees Celsius (° C.)*Meters (m))/(Ohms (Ω))). A larger value of $\mu$ indicates that the resistance of the heat trace increases more rapidly with an increase in temperature; meaning the heat trace has a higher degree of self-regulation.

The intercept in the equation (1), $\beta$, is expressed in units of temperature, commonly degrees Celsius (° C.) and is typically a negative value. The value of $\beta$ represents the temperature at which the resistance of the heater would theoretically be zero. This situation is impossible, and values of $\beta$ are commonly lower than the coldest theoretical temperature of absolute zero. A smaller absolute value of $\beta$ (a less negative number) indicates a piece of heat trace that operates at a higher power output for a given temperature. That is, the resistance is lower for a given temperature.

Different types of heat trace are made with different core materials, varying amounts of conductive paths, and different core dimensions. These factors can all affect the relationship between resistance and temperature. As a result, μ and β are different for different types of heat trace.

For a given type of heat trace, that has consistent core material and dimensions, variations in μ and β are mainly due to differences in the number of conductive paths which can be described as the power factor (γ). If a piece of trace has more conductive paths per unit length it will have a lower resistance and will produce more heating power, resulting in a higher power factor. An increase in power factor results in both an increase to μ and β. As a result, a piece of heat trace with a higher power factor will operate at a higher power level for a given temperature and will display a higher degree of self-regulation.

It is possible to experimentally determine μ and β by measuring R and T throughout the heating cycle of a piece of heat trace and fitting a curve in the stable heating region. Measuring the temperature at a single point will produce values for μ and β that describe the relationship between the resistance of the entire piece of trace and the temperature at that point. Therefore, it is important to measure the resistance at several points along the piece of heat trace to relate the average temperature of the piece of heat trace to the resistance of the piece of heat trace. By repeating this exercise across different pieces of heat trace of the same type with different power factors, it is possible to create a family of possible μ and β combinations for a range of power factors. For a given power factor, there is only one possible combination of μ and β.

For pieces of trace that can be characterized in a lab or factory setting, it is possible to determine the values of μ and β experimentally. With this method, pieces of heat trace can be characterized in a lab or factory setting and marked with an identifying tag. When the piece of trace is connected to a controller, the installer can input information from the tag into the controller during calibration so the control algorithm can use the correct values of μ and β. The experimental method may also be useful for systems where a piece of pre-terminated trace is connected to a controller in a factory. In situations where the controller is connected to a temperature sensor that is on the piece of installed heat trace this method may also be used. However, it should be noted that accuracy on the values of μ and β will be significantly higher if a larger number of point temperatures are recorded. This may be possible by running multiple trials using one temperature sensor and moving it to different locations to account for power factor variation within the piece of trace.

If the heat trace was not characterized in the factory and onsite characterization is impractical, the power factor can be determined during the calibration process by using measurements of the trace behavior during the inrush period. The power factor can then be used to find the appropriate values of μ and β.

When power is applied to a piece of heat trace, the current rises to a maximum within the first couple of seconds of operation then decreases at a rapid rate, settling to an operating current that is typically ⅓ to ⅕ of the maximum current. The maximum current of a piece of trace corresponds to a minimum resistance and is dependent on the length, type, power factor, and starting temperature. The relationship on a per unit basis between the minimum resistance $R_{MIN}$ and the starting temperature $T_0$ for a given pieces of trace is approximately linear. A linear approximation where δ and τ are constants is shown below as equation (2).

$$\frac{R_{MIN}}{\ell} = \delta(T_0) + \tau \qquad (2)$$

For a piece of heat trace that has not been heated, it can be assumed that the starting temperature is equal to the ambient temperature of the surroundings. This assumption may not hold true for pieces of heat trace that exist in areas where the surroundings are not at ambient temperature, such as a piece of heat trace on a hot pipe. In this case, the initial temperature of the heat trace will need to be measured with a temperature sensor. The minimum resistance can be calculated by dividing the operating voltage by the maximum measured current. The length of the piece of heat trace must be measured during installation.

The slope of equation (2), δ, is in units of (resistance/(temperature*length)) or (Ω/(° C.*m)). The minimum inrush resistance typically increases with temperature such that δ is usually positive. A larger value of δ indicates a higher sensitivity of the minimum inrush resistance to temperature. The intercept τ is in units of (resistance/length) or (Ω/m). When the equation is expressed using the Celsius scale, τ represents the expected minimum resistance on a per unit length basis of the heat trace at 0° C.

For a given power factor, there is only one combination of δ and τ, such that each pair of δ and τ values has a corresponding pair of μ and β values. Values for δ and τ can be found experimentally by measuring the minimum inrush resistance of a piece of trace with a known power factor at different starting temperatures and using a linear fit on the resulting data points. By repeating this exercise across different pieces of heat trace of the same type with different power factors, it is possible to create a family of possible δ and τ combinations for a range of power factors. This method allows the values of μ and β for a piece of trace of known type and lengths operating at a known starting temperature to be determined in situ.

Using the inrush current method allows for accurate characterization of installed pieces of heat trace despite the presence of variations in the heat loss conditions of the piece of trace. The minimum resistance is measured during the initial heating period which is so short that the piece of heat trace has not heated to a significant degree. As a result, there is very little heat loss to the surroundings during this period, meaning the type of installation has little effect on characterization.

For pieces of heat trace that are characterized and have a known power factor, the length can be measured in the field using the following equation.

$$\ell = \frac{R_{MIN}}{\delta T_0 + \tau} \qquad (3)$$

Control

Once a piece of heat trace is characterized such that the temperature may be found with some degree of accuracy from the resistance of the piece of heat trace, the resistance-based temperature may be used to control the piece of heat trace. Several methods are available to control the temperature of a piece of heat trace using the resistance-based temperature as a control signal including simple thermostat control, PID control, and others.

As stated previously, the resistance of a piece of heat trace can only be measured during operation. As a result, when using resistance-based temperature as the basis for control, the system is effectively blind when the heat trace is turned off. Furthermore, resistance-based temperature measurements using equation (1) may only be taken once the heat trace has reached the stable operating zone. As a result, the heater must be on for some period before the temperature is known. The following sections describe several methods to overcome these issues and improve control accuracy.

In long cycle control, the heat trace is heated for a period of time sufficient to reach the stable operating period at which point the resistance-based temperature found using equation (1) is used as a basis for control. Applications for long cycle control include systems where simplicity is preferred, and a larger operating temperature range is acceptable. The off-time between heating pulses can be constant or dynamic. If the off-time is dynamic it could be set based on the amount of time it takes the heating cycle to reach a setpoint. In this method, taking a longer time to reach the setpoint would indicate a lower starting temperature or increased heat loss in the system for that cycle and the off period would be reduced such that less heat loss would occur in the off period. The off period could also be based on the temperature reached after a set on period. In this method, a higher temperature reached after a set period would be indicative of a higher starting temperature for that cycle and the off period could be extended.

Using long cycle control necessitates minimum off and on periods in the range of 3 to 7 minutes in order to reach the stable operating zone. Longer off and on periods may result in a larger temperature swing as the system is heating or cooling for a longer period of time.

Medium cycle control offers an option to reduce the minimum off and on periods to reduce the overall temperature swing in the system. In this method, the minimum initial resistance is used to calculate the starting temperature of the heat trace using the following equation:

$$T_0 = \frac{R_{MIN}}{\ell\delta} - \frac{\tau}{\delta} \quad (4)$$

Using medium cycle control allows the system to read a value of temperature at the moment when the heat trace is reactivated, before any significant new heating has occurred. The control algorithm can then adjust the on or off time of the heater based on the initial temperature reading.

A third control technique referred to as short cycle control consists of cycling the power to the heating element at a rapid rate such that the core temperature of the heat trace does not decrease appreciably between activation periods. When the core temperature of the heat trace remains high, there is little to no inrush period and equation (1) may be used to determine the temperature of the heat trace despite a much shorter heating cycle. Short cycle control may include cycling the trace at a rate of approximately 60 hz which is the typical frequency for main power in North America. In this case, the method is akin to voltage modulation. An alternative to short cycle control is to use other methods of voltage modulation to reduce heating power while maintaining the ability to read the temperature of the system continuously.

The initial temperature reading found using equation (4) may be used in combination with the stable temperature found using equation (1) in a control algorithm that combines medium and long cycle control. When both temperature values are used in combination with the total off time, the control algorithm can determine the rate of heat loss in the system. The rate of heat loss in the system can then be used to determine the amount of heat that should be input into the system in order to achieve a desired result such as maintaining a set temperature.

A sensing cycle may also be used where the system calculates the heat loss using the method described above and then operates a set power cycle for some period after which the system repeats the sensing cycle and adjusts the power output.

For all of the control methods mentioned, the setpoints may be static and set by a user, or dynamic and set by the control algorithm. For dynamic setpoints, the control algorithm may use other system information such as may be available from temperature sensors, flow sensors, local weather data, or other sources including other control systems that are connected to the heat trace controller. For example, a system may increase the temperature setpoint when the ambient temperature decreases. In another example for a system with a high thermal capacity which takes longer to heat, a forecast of ambient temperature may be used to adjust the current setpoint to achieve a more consistent process temperature.

Dynamic setpoints may also change based on feedback in the system. For example, a system may increase the temperature setpoint automatically if it senses increased heat loss as measured from the method described above. A system model may be used to determine dynamic setpoints. For example, a system designed to melt snow or ice may adjust the power output to ensure phase change is occurring. The system model would be used to determine when phase change is occurring by measuring the change in temperature for a given power input. When phase change is occurring, energy is used to overcome the latent heat of fusion resulting in a smaller increase in temperature.

Monitoring

Reliability is a key feature of most heat tracing systems. It is critical that the control system can detect and identify faults within the heat tracing system as quickly as possible to allow corrective action before other problems occur as a result of a failure in the heat tracing system. Existing monitoring systems look for several potential failure modes by monitoring the circuit current, ground fault current, temperature, and voltage on the heat tracing circuit. With this information, thresholds can be set to flag values that are outside of set minimum and maximum acceptable thresholds for each parameter. Corrective action can also be taken such as shutting of the circuit if the ground fault current exceeds an acceptable threshold.

While this type monitoring is valuable, it is limited and cannot detect all failure conditions. Current thresholds for example, are limited by the self-regulating of heat trace since the trace will see a wide range of operating currents as it operates at differing temperatures. As a result, the low and high current thresholds must be set well away from the typical operating current to limit false failure notifications. As a result, there is a wide current range where failure is not detectable.

To improve monitoring, a system model may be used to determine expected operating parameters. When monitored values differ from the expected operating parameters by some threshold, abnormal operation indicative of a fault condition may be occurring and can be flagged. This method allows tighter thresholds to be used, reducing the range of failure conditions that can occur without notice.

By way of example, a heat trace circuit operating at 0° C. 20 W/ft that is 100 ft long will draw ~2000 W. The same piece of heat trace operating at 50° C. may draw 15 W/ft for a total load of 1500 W. If this can be considered the typical operating range then a minimum load threshold may be set at 1400 W. If the same piece of heat trace is damaged such that only 75 ft is now operational, operation at 0° C. will draw 1500 W, well within the acceptable operating range. Using the method described above, the control system would know, through a system model that incorporates ambient temperature that the piece of heat trace is operating near 0° C. As such, the minimum load threshold could be set at 1900 W and the damage would be noticed.

The expected operating temperature of a piece of heat trace as measured by resistance (T(R)) is a function of the initial resistance ($R_0$), initial temperature ($T_0$), ambient temperature ($T_a$), the temperature of the system ($T_{sys}$), the time since start up (t), the total time the heat trace has been on ($t_{tot}$), the total time on in the last cycle ($t_{on}$), and the total time off in the last cycle ($t_{off}$). For some simple systems, the expected temperature function may be determined and used to estimate expected operating behavior using a threshold for the acceptable range φ. This relationship is shown below in equation 5:

$$T(R)=T(R_0,T_0,T_a,T_{sys},t,t_{tot},t_{on},t_{off}) \pm \phi \qquad (5)$$

In instances where the difference between the estimated temperature and the temperature as measured by resistance is more than φ, the system may be in fault condition. When the function in equation 5 is known, it can also be used to understand other behavior in the system. For example, if the ambient temperature is constant, and with all other factors the same, the trace temperature begins to drop, it may be deduced that the system temperature is dropping.

The rate of temperature change in a piece of heat trace has a maximum limit based on the thermal conditions that the heat trace is operating under. As such, limits can be set on the rate of change of the temperature (or resistance) that would occur under normal operating conditions. These maximum and minimum derivatives reflect the thermal capacity of the heating system. A well-insulated pipe heating system will have a lower maximum temperature derivative and a higher minimum temperature derivative than an exposed piece of heat trace. This is due to the fact that the insulation and thermal mass of the pipe prevent rapid changes in temperature. With derivative limits in place, the monitoring system can flag rapid perceived changes in resistance or temperature that may actually be a result in changes to the state of the heat trace, such as damage or burnout.

For most systems, a simple threshold for the rate of change should suffice. The threshold could be determined by experimentation on the system in question or taken from a table listing values for different types of systems. In more complex cases, the expected rate of change of a piece of heat trace can be estimated by equation 6 below where ω is the threshold for an acceptable range:

$$\frac{dT}{dt} = f(R_0, T_0 T_a, T_{sys}, t, t_{on}, t_{off}) \pm \omega \qquad (6)$$

For systems with data collection, the functions in equation 5 or 6 may be determined analytically through machine learning or other computational methods where information on the historical operation of the system is used to build the functions. In addition, historical system data along with historical ambient temperature, system temperature, or other relevant data can be used to create an expected model of operation for a given set of conditions.

By way of example, a pipe heating system is designed to maintain 50° F. when the ambient temperature drops below 32° F. Data over several years shows that when the ambient temperature is at 20° F. and the water enters the pipe at 75° F., the system draws an average of 850 W to maintain 50° F. If, under the same conditions, the system is now drawing 900 W to maintain 50° F., then there may be a problem with the pipe, such as missing or wet insulation which is causing the change in performance. Alternatively, using the same system but time on as the key metric, the data may show a that the heater must be on longer to achieve the same result under similar environmental conditions. This may be an indication that the heat trace is aging and operating at a reduced power level. By tracking data over time, the control system can determine when an aging piece of heat trace should be replaced.

A system can also be set to calibrate at some interval using the methods described earlier in this disclosure. In this way, the system will determine the power factor of the trace at each calibration. By tracking the power factor over time, the system can determine that the trace is aging, which results in a lower power factor.

The above methods may be used to control heat trace in any type of installation. Examples include; freeze protection, snow melting, de-icing, process temperature maintenance, pipeline temperature maintenance, and floor heating. Further, the methods may be used in all types of heat tracing markets including, residential, commercial, industrial, and infrastructure.

In view of the foregoing detailed description of the various embodiments of the present invention, the following figures illustrate various characteristics of the pieces of heat trace, of the heat trace systems, of the methods used to control the pieces of heat trace, and the methods directed to characterization, calibration, control and monitoring of the heat trace systems.

Figure 1:
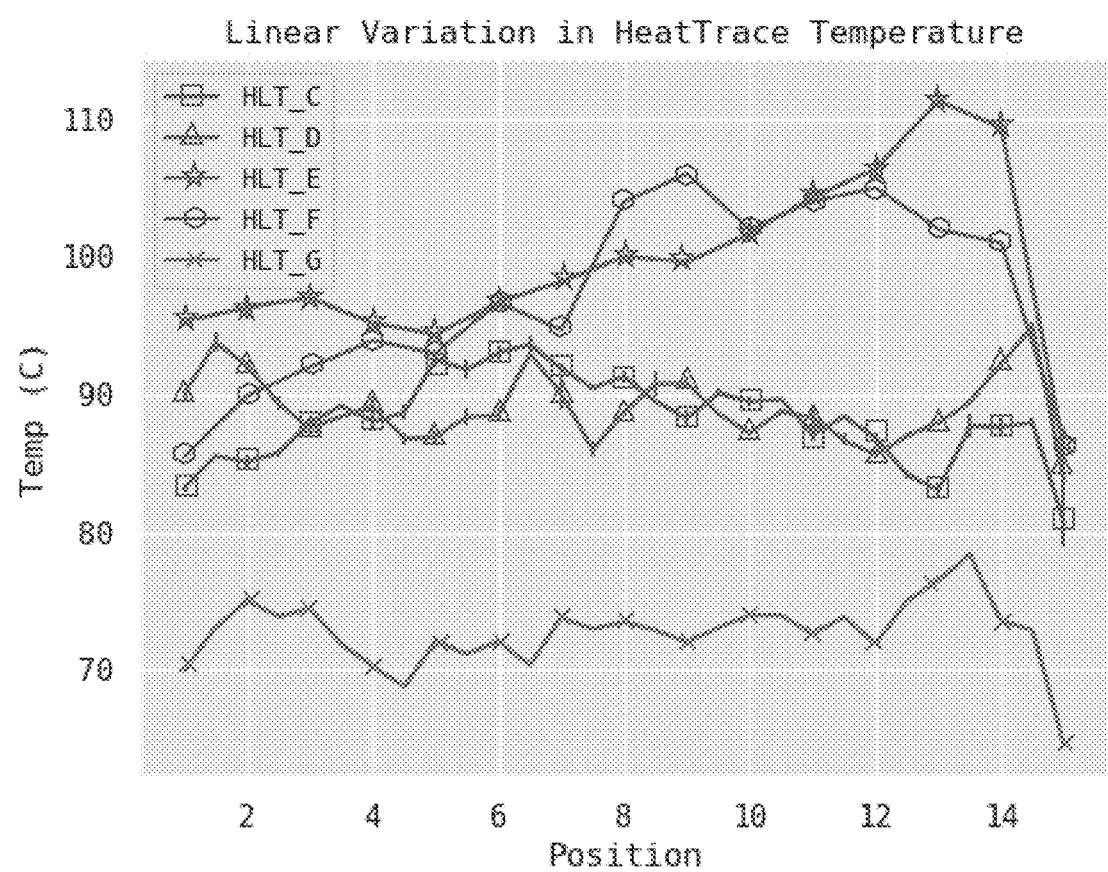
FIG. 1 illustrates steady state temperature of pieces of heat trace, as measured via infrared camera at one foot increments, along multiple pieces of heat trace.

FIG. 1 illustrates a steady state temperature of pieces of heat trace, as measured via infrared camera at one foot increments, along multiple pieces of heat trace. Each piece of heat trace is nominally 10 W/ft and powered at 120V. The pieces of heat trace are from different manufacturing runs and each exhibit significant temperature variation along their length. The variation in temperature along the length of each piece of heat trace highlights the difficulties in using a point temperature sensor to accurately control heat trace. The wide range of temperatures illustrate the wide variation in power output between different pieces of heat trace. Variations in temperature directly correspond to variations in the linear power factor along each piece of heat trace. Higher temperature indicates a higher power factor. As such, the pieces of heat trace may be ordered in terms of power factor starting with the highest power factor: HLT_E, HLT_F, HLT_C, HLT_D, and HLT_G.

Figure 2:
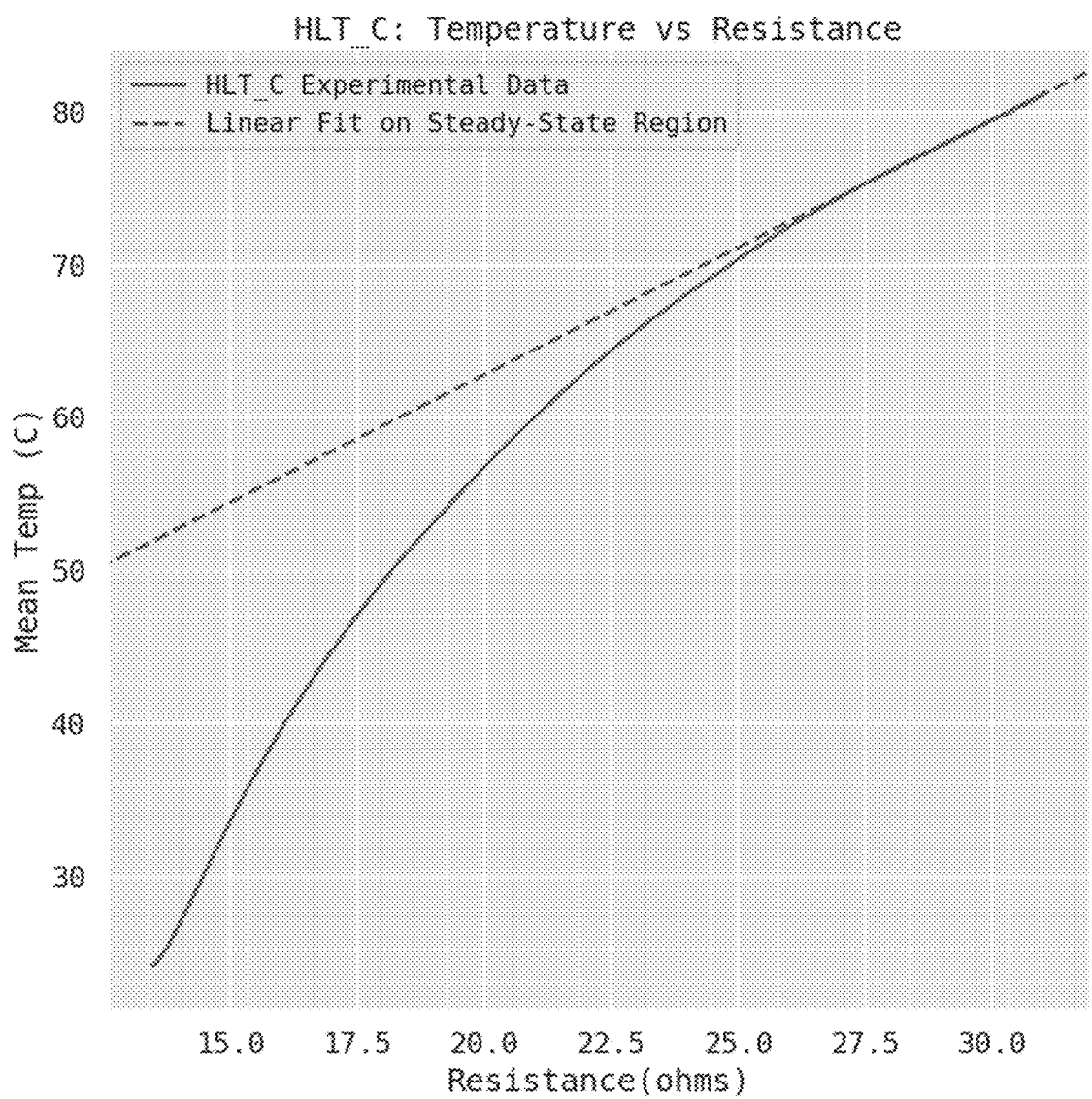
FIG. 2 illustrates temperature vs. resistance for an experimental test piece of heat trace, where temperature is calculated using equation (1), according to an embodiment of the present invention.

FIG. 2 illustrates a plot of temperature vs. resistance for an experimental test of a piece of heat trace where temperature is calculated using equation (1). The portion of the plot in the upper right-hand corner shows how the linear fit is a good approximation in the steady state range. The plot also shows how the linear fit is not an accurate determination of temperature during the inrush phase when current is higher and resistance is lower.

Figure 3:
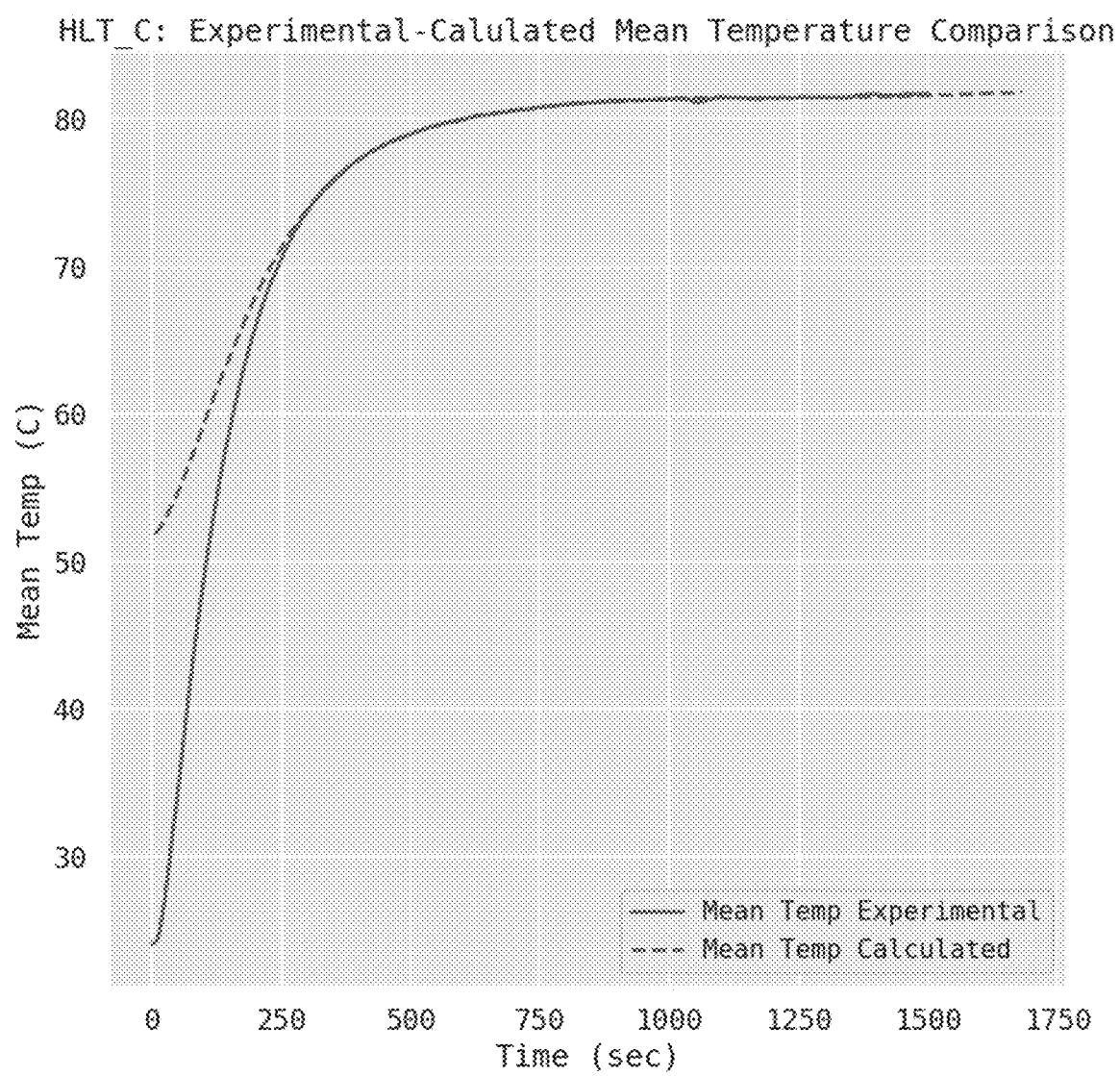
FIG. 3 illustrates temperature vs. time for the same trial shown in FIG. 2, where temperature is calculated from resistance using equation (1)

FIG. 3 illustrates a plot of temperature vs. time for the same trial shown in FIG. 2, where temperature is calculated from resistance using equation (1). FIG. 3 illustrates that the calculated temperature using equation (1) is accurate outside of the initial inrush period. Additionally, FIG. 3 shows that the inrush period for this piece of heat trace is approximately 300 seconds.

Figure 4:
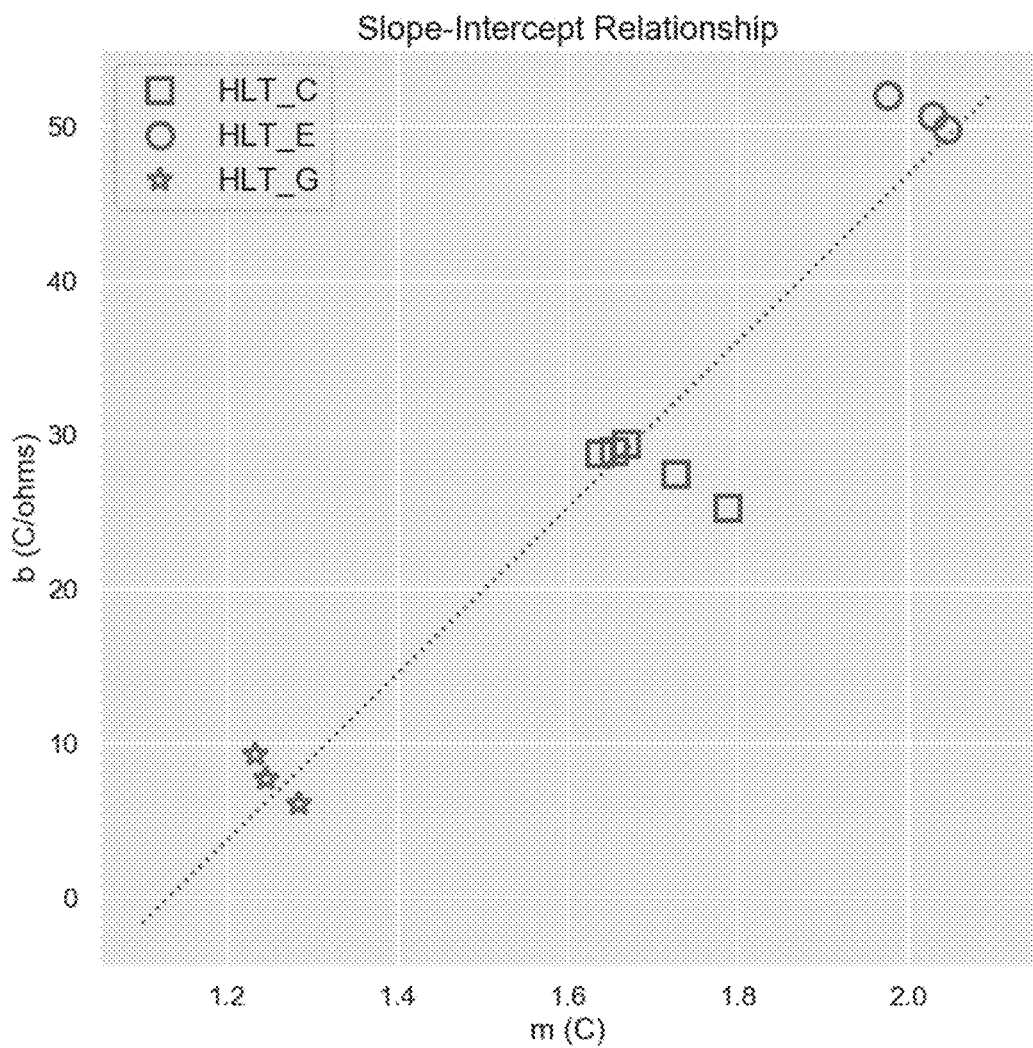
FIG. 4 illustrates a relationship between slope (m) and intercept (b) for a linear fit of the steady state region of a resistance vs. temperature curve for a heating trial as shown in FIG. 2, where each point represents a linear fit created using average temperature along the piece of heat trace as measured by multiple temperature sensors.

FIG. 4 illustrates the relationship between the slope (m) and the intercept (b) for a linear fit of the steady state region of a resistance vs. temperature curve for a heating trial as shown in FIG. 2. Each point represents a linear fit created using the average temperature along the piece of heat trace as measured by multiple temperature sensors. The plot shows that slope (m) and intercept (b) are related such that there is a linear fit of the data for pieces of heat trace with varying power factors. The position along the line of each point indicates the power factor with the lowest power factor (HLT_G) in the lower left corner and the highest power factor (HLT_E) in the upper right corner.

Figure 5:
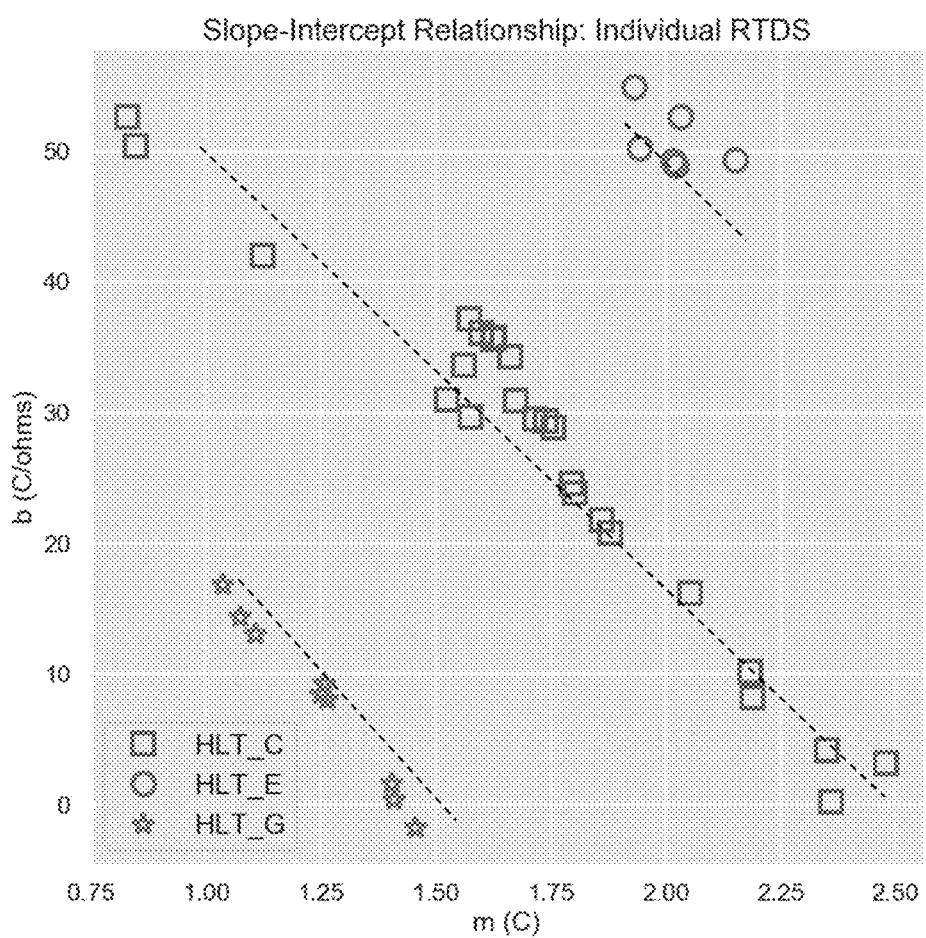
FIG. 5 illustrates a relationship between the slope (m) and intercept (b) for a linear fit of the steady state region of a resistance vs. temperature curve for a heating trial as shown in FIG. 2, where each point represents a linear fit create using a single point temperature sensor.

FIG. 5 illustrates a relationship between the slope (m) and the intercept (b) for a linear fit of the steady state region of a resistance vs. temperature curve for a heating trial as shown in FIG. 2. Each point represents a linear fit created using a single point temperature sensor. Values for each piece of heat trace shown appear to be in line, as represented by dashed lines. The dashed line for each set of values would intersect the linear fit in FIG. 4 near the groupings in FIG. 4. This plot shows the challenge of creating a temperature vs. resistance curve using a single point sensor due to the variation in temperature along the length of the piece of trace. Values toward the bottom right of the plot indicate tests where the temperature was taken at a point that was colder than the average temperature of the entire piece of heat trace. Values towards the upper left of the plot indicate tests where the temperature was taken at a point hotter than the average temperature of the entire piece of heat trace.

FIG. 6 is a plot of the maximum initial inrush temperature vs. the starting temperature for multiple pieces of heat trace, each tested at multiple temperatures. The plot shows that for a given piece of heat trace, there is a linear relationship between the maximum initial current and the starting temperature. From this plot it is apparent that the linear relationship between maximum initial current and starting temperature is also highly dependent on the power factor of a piece of heat trace.

FIG. 7 illustrates the same plot as FIG. 6, that is, the maximum initial inrush temperature vs. the starting temperature for multiple pieces of heat trace, but is resized to include data on two other tests. The additional test pieces are a combination of the original test pieces. The plot shows that the linear relationship holds for longer pieces of heat trace and illustrates dependency on length.

FIG. 8 illustrates data from the trials shown in FIGS. 6 and 7, but uses normalized maximum initial current on the vertical axis. This plot further illustrates the dependency on length and the normalized data shows each linear fit is differentiated solely by power factor. Data for HLT_CD is from a test with both HLT_C and HLT_D wired in parallel. In this configuration, HLT_CD would have a power factor that is the average of HLT_C and HLT_D. As expected, the linear fit for HLT_CD falls directly between the linear fit for HLT_C and HLT_D.

FIG. 9 illustrates a relationship between m (slope) and b (intercept) for the linear fits of the data of FIGS. 6 and 7. The linear relationship of these values illustrates the relationship between slope and intercept. The position of each point along the line is dependent on the length and power factor of the piece of heat trace in question.

FIG. 10 illustrates a relationship between m (slope) and b (intercept) for the linear fit of the data of FIG. 8. The position of each point along the line is dependent on the power factor of the piece of heat trace in question.

FIG. 11 illustrates measured current for multiple heating trials of five different pieces of heat trace. The inrush period for each piece of heat trace last approximately 300 seconds. The maximum current occurs in the first two seconds.

FIG. 12 illustrates the same plot as FIG. 11, that is, measured current for multiple heating trials, but with the addition of shaded areas that represent dynamic thresholds based on an expected system operating model and some tolerance. The dashed lines indicate example static thresholds that may be found on state of the art systems. The shaded area around HLT_G represents a very different acceptable operating range than the shaded area around HLT_F. The difference in the acceptable operating ranges is due to a difference in power factor. The plot shows advantages of using a system operating model to determine a much narrower acceptable operating range.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for determining an average temperature of a piece of self-regulating heat trace in a process heating system using a value of measured resistance acquired by a controller, the method comprising the steps of:
   using measured current and voltage, as acquired by the controller, to determine a measured resistance of the piece of self-regulating heat trace while the piece of self-regulating heat trace is activated by the controller; and
   using the determined measured resistance of the piece of self-regulating heat trace, together with a power factor of the piece of self-regulating heat trace, to determine an average temperature of the piece of heat trace, wherein the controller is configured to use the average temperature of the piece of self-regulating heat trace as a basis of control of the process heating system, or to monitor the process heating system and provide notification if the average temperature of the piece of heat trace deviates from an expected operating range.

2. The method of claim 1, wherein, as a basis for control, a control algorithm governs a turning of a heater on or off based on the average temperature determined, thereby achieving a desired temperature set point or range for the process heating system.

3. The method of claim 2, where control setpoints of the desired temperature set point or range are modified using a system model and external information from sensors or connected systems.

4. A method for determining an average temperature of a piece of heat trace using measured resistance, the method comprising the steps of:
   using measured current and voltage to determine a measured resistance of the piece of heat trace while the piece of heat trace is active; and
   using the determined measured resistance of the piece of heat trace to determine an average temperature of the piece of heat trace;

wherein external information from sensors, weather data, or other systems, is used to increase an accuracy of a system model where other system parameters are deduced from a resistance based heat trace temperature and the system model, wherein, in a freeze protection system, the resistance based heat trace temperature and ambient temperature are used as a basis for control to maintain an expected temperature of a fluid to be protected or to monitor the freeze protection system and provide notification if the resistance based heat trace temperature deviates from an expected operating range.

5. The method of claim 4, wherein control setpoints of the expected temperature of the fluid to be protected are modified using a system model and external information from sensors or connected systems.

6. A method for determining an average temperature of a piece of heat trace using measured resistance, the method comprising the steps of:
  using measured current and voltage to determine a measured resistance of the piece of heat trace while the piece of heat trace is active;
  using the determined measured resistance of the piece of heat trace to determine an average temperature of the piece of heat trace; and
  using the average temperature determined as a basis for control to maintain an expected temperature of a fluid to be protected in a system, or to monitor the system and provide notification if the average temperature determined deviates from an expected operating range;
wherein the piece of heat trace is heated for a period of time sufficient to allow an inrush period of heating to pass, wherein a stable operating period is reached, and a temperature of the piece of heat trace is assessed in the stable operating period to determine the average temperature, where the temperature of the piece of heat trace assessed in the stable operating period is used as the basis for control.

7. The method of claim 6, wherein the temperature of the piece of heat trace $T_T$ is assessed in the stable operating period using the following equation:

$$T_T = (\mu)\frac{R_T}{\ell} + \beta$$

where $R_T$ is the measured resistance of the piece of heat trace, $\mu$ and $\beta$ are constants depending on a type of heat trace, and l is a length of the piece of heat trace; where the temperature of the piece of heat trace $T_T$ is used as the average temperature determined.

8. The method of claim 7, where $\mu$ and $\beta$ for a given piece of heat trace are determined using a linear fit on measured values of $R_T$ and $T_T$ during the stabilized operating period of heating, where the stabilized operating period of heating follows the inrush period of heating.

9. The method of claim 8, where $\mu$ and $\beta$ for a given piece of heat trace are determined using a minimum resistance during the inrush period of heating ($R_{MIN}$) and a heat trace starting temperature ($T_0$), where the following equation is used to find values of $\delta$ and $\tau$ which correspond to known values of $\mu$ and $\beta$ for a piece of heat trace having a same power factor.

$$\frac{R_{MIN}}{\ell} = \delta(T_0) + \tau$$

10. The method of claim 6, wherein control setpoints of the expected temperature of the fluid to be protected in the system are modified using a system model and external information from sensors or connected systems.

11. A method for determining an average temperature of a piece of heat trace using measured resistance, the method comprising the steps of:
  using measured current and voltage to determine a measured resistance of the piece of heat trace while the piece of heat trace is active;
  using the determined measured resistance of the piece of heat trace to determine an average temperature of the piece of heat trace; and
  using the average temperature determined as a basis for control to maintain an expected temperature of a fluid to be protected in a system, or to monitor the system and provide notification if the average temperature determined deviates from an expected operating range;
wherein a minimum resistance during an in-rush period of heating is used to find an initial temperature of the piece of heat trace,
factoring a power factor of the piece of heat trace, where the initial temperature of the piece of heat trace is used as the basis for control.

12. The method of claim 11, wherein the minimum resistance $R_{MIN}$ during the in-rush period of heating is used to find the initial temperature $T_0$ of the piece of heat trace using the following equation:

$$T_0 = \frac{R_{MIN}}{\ell\delta} - \frac{\tau}{\delta}$$

where $\delta$ and $\tau$ are constants, depending on a power factor of the piece of heat trace.

13. The method of claim 11, wherein control setpoints of the expected temperature of the fluid to be protected in the system are modified using a system model and external information from sensors or connected systems.

14. A method for determining an average temperature of a piece of heat trace using measured resistance, the method comprising the steps of:
  using measured current and voltage to determine a measured resistance of the piece of heat trace while the piece of heat trace is active;
  using the determined measured resistance of the piece of heat trace to determine an average temperature of the piece of heat trace; and
  using the average temperature determined as a basis for control to maintain an expected temperature of a fluid to be protected in a system, or to monitor the system and provide notification if the average temperature determined deviates from an expected operating range;
wherein the piece of heat trace is cycled at a fast enough rate where cooling of a core of the piece of heat trace does not occur and there is little to no inrush period of heating, wherein the temperature of the piece of heat trace may be controlled without a need for an extended on period to determine a stable temperature.

15. The method of claim 14, wherein the temperature of the piece of heat trace $T_T$ is controlled based on the following equation:

$$T_T = (\mu)\frac{R_T}{\ell} + \beta$$

where $R_T$ is the measured resistance of the piece of heat trace, μ and β are constants depending on a type of heat trace, and l is a length of the piece of heat trace.

16. The method of claim 14, wherein control setpoints of the expected temperature of the fluid to be protected in the system are modified using a system model and external information from sensors or connected systems.

17. A method for determining an average temperature of a piece of heat trace using measured resistance, the method comprising the steps of:
   using measured current and voltage to determine a measured resistance of the piece of heat trace while the piece of heat trace is active;
   using the determined measured resistance of the piece of heat trace to determine an average temperature of the piece of heat trace; and
   using the average temperature determined as a basis for control to maintain an expected temperature of a fluid to be protected in a system, or to monitor the system and provide notification if the average temperature determined deviates from an expected operating range;
   wherein both an initial temperature as determined by a minimum resistance during an in-rush period of heating, and a stable temperature, are used in combination with a period of time during which the piece of heat trace has been off to determine a rate of heat loss from the piece of heat trace which is then used as the basis for control.

18. The method of claim 17, where the rate of heat loss is calculated through a sensing cycle, then a set duty cycle is determined which operates for a period between sensing cycles.

19. The method of claim 17, wherein control setpoints of the expected temperature of the fluid to be protected in the system are modified using a system model and external information from sensors or connected systems.

* * * * *